March 31, 1959    M. HIRSCHEY ET AL    2,879,711

MARKING APPARATUS

Filed Sept. 15, 1955            5 Sheets-Sheet 1

INVENTORS.
MALCOLM HIRSCHEY, IRA S. GOTTSCHO
AND ANDREW J. ALESSI, JR.
BY

ATTORNEY

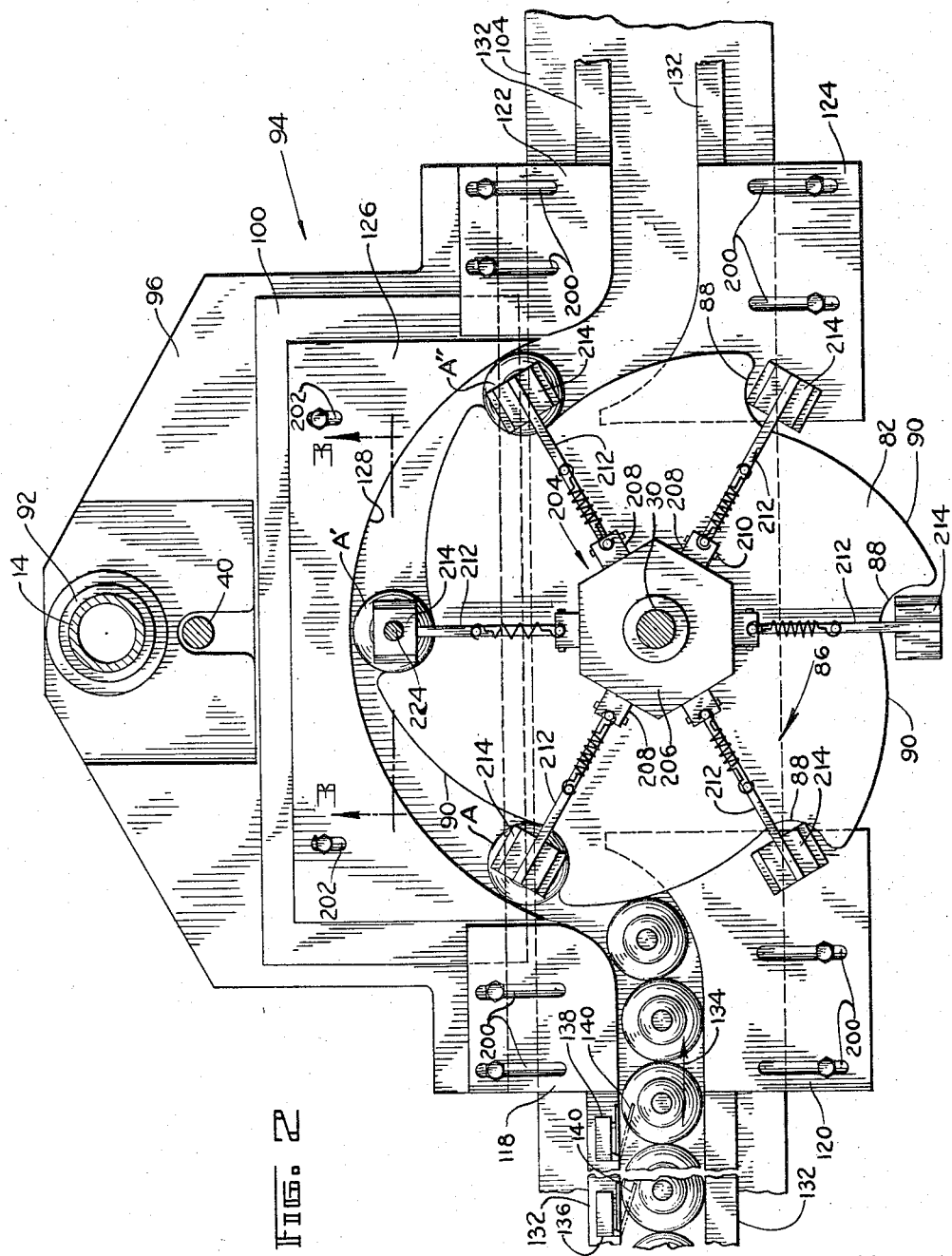

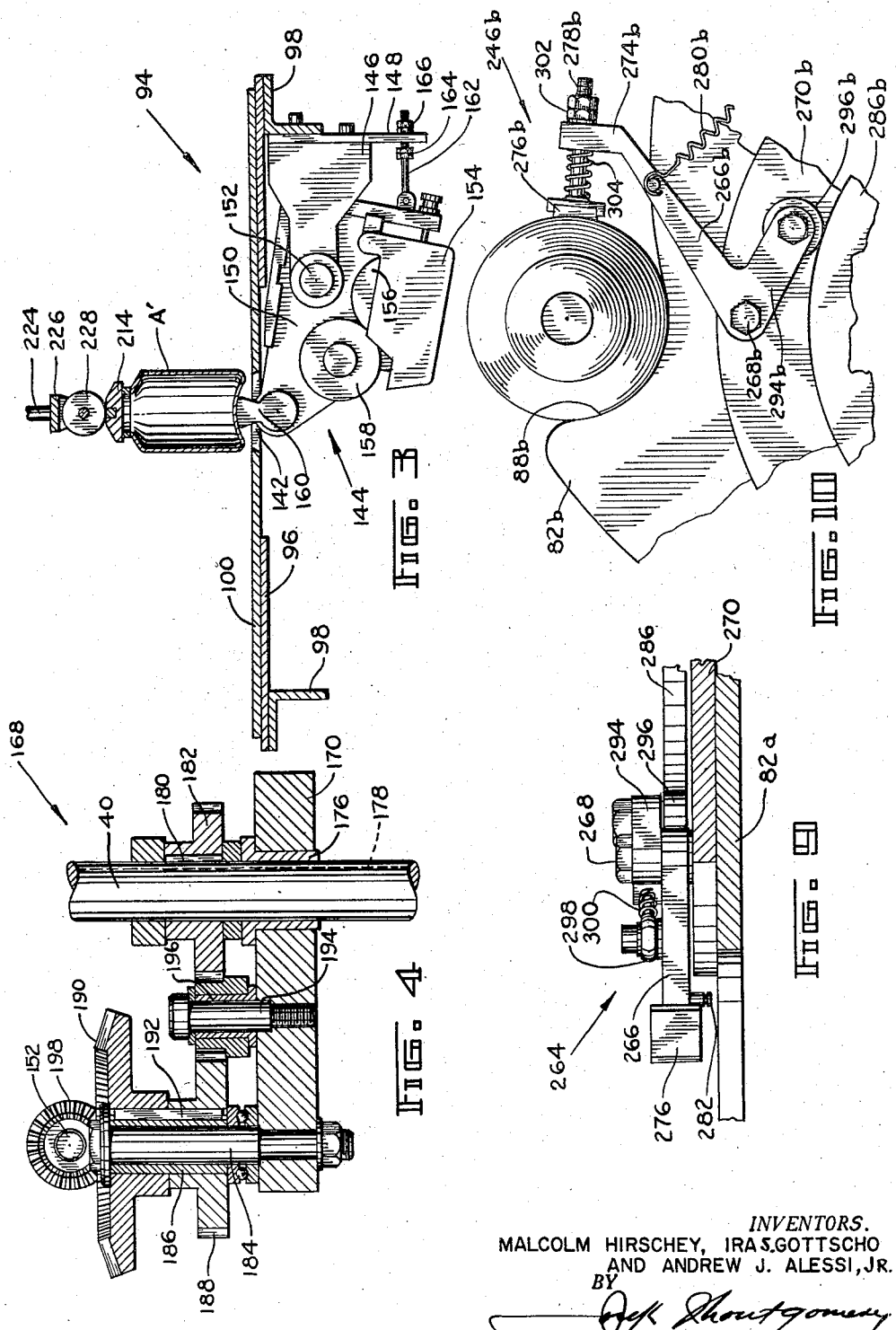

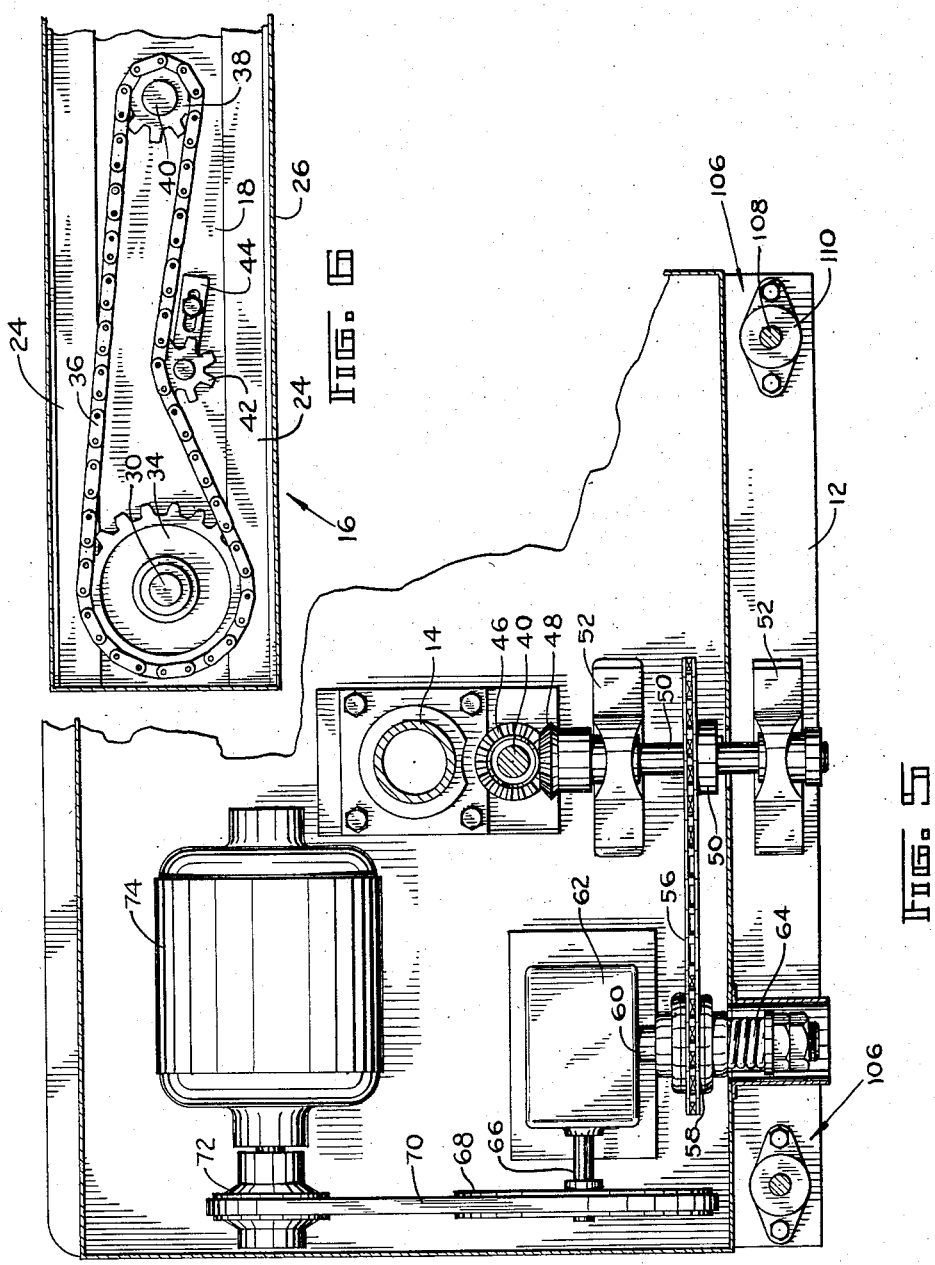

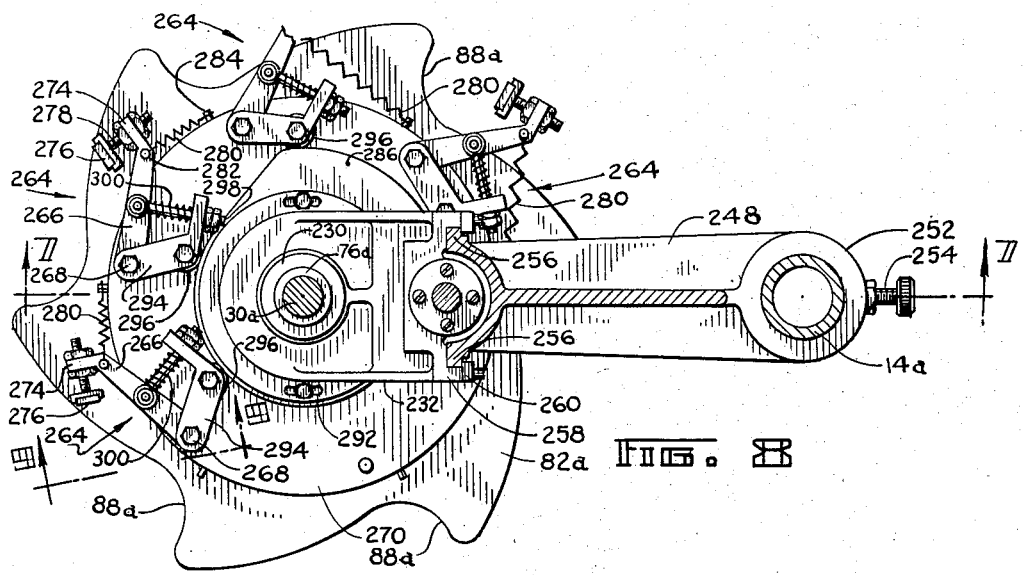
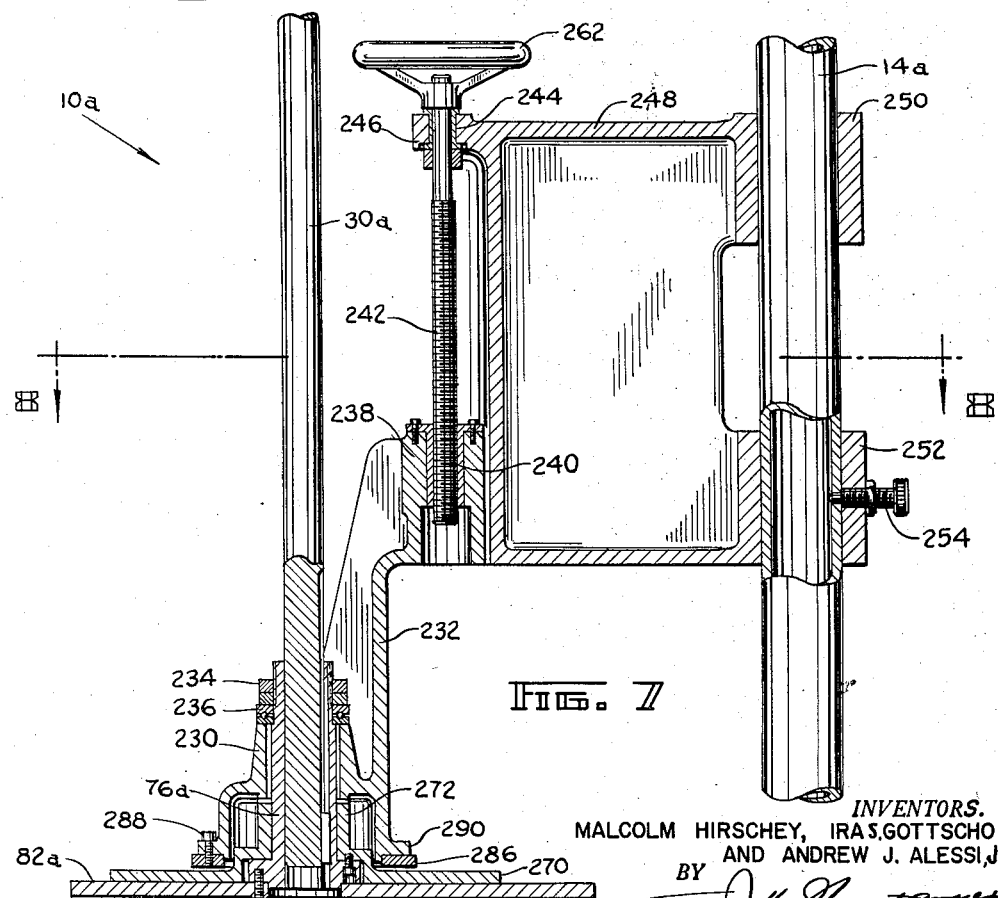

2,879,711
MARKING APPARATUS

Malcolm Hirschey, Woodside, N.Y., and Ira S. Gottscho, Milburn, and Andrew J. Alessi, Jr., Colonia, N.J., assignors to Adolph Gottscho, Inc., Hillside, N.J., a corporation of New York Application September 15, 1955, Serial No. 534,496

9 Claims. (Cl. 101—44)

The present invention relates generally to marking apparatus, and more particularly is directed to apparatus for applying markings to conveyed articles.

It is the usual practice to apply markings to containers or receptacles for food, cosmetic and other products to provide coded indications thereon; for example, of the date of filling, contents or the like, as the containers are conveyed from one station to another in a production line; for example, between a filling station and an inspection or packing station. Many existing devices provided for applying markings to containers, receptacles or other articles, as the latter are carried by a belt, or other conveyor, require the interruption of the conveyor over a considerable length of the conveyor path so as to provide a gap in the latter in which the marking device can be interposed. When the article conveyor is interrupted to accommodate the marking device therein, dead plates are employed between the conveyor and the infeed and outfeed ends of the marking device to carry the articles from the article handling conveyor to the arrangement moving the articles through the marking device and from such arrangement back onto the production line conveyor. However, many articles are not suitable for handling across dead plates, and the interruption of the article handling conveyor may involve considerable expense and prevents the relocation of the marking station along the conveyor without redesign of the latter. Sometimes, in order to mark articles that are not susceptible to handling across dead plates and to avoid the necessity of interrupting the article handling conveyor, the marking device is disposed alongside the article handling conveyor, with the infeed and outfeed conveyors of the marking device extending parallel to the article handling conveyor, and the articles are ploughed, or moved laterally, from the article handling conveyor to the infeed conveyor of the marking device and then, following the marking of the articles, from the outfeed conveyor back onto the article handling conveyor. However, this last mentioned solution is not always acceptable as there are some products that are not susceptible to either handling across dead plates or ploughing between parallel conveyors, and the ploughing or lateral movement of the articles requires relatively complex and expensive additions to the usual marking device.

Furthermore, in existing marking devices, particularly devices for marking the bottom surfaces of successive conveyed articles, the holddown arrangement for restraining upward movement of the conveyed article, during the marking of the bottom surface of the latter, does not move with the article in the direction of the travel of the latter through the marking device and tends to tip or overturn the article, particularly when the latter is unstable, that is, has a relatively high center of gravity. Existing marking devices are also disadvantageously characterized by: the imparting of a sudden acceleration to the article to be marked, which is undesirable in the case of an unstable article that can be easily tipped or toppled over; the limitation of any device to the marking of only one kind or size of article and the limitation upon the capacity of such machine to be adapted, by the replacement of certain parts, to the marking of other, differently shaped or dimensioned, articles; the difficulty with which a device designed to mark the bottom surfaces of conveyed articles can be modified to mark the top surfaces of the articles, as well as, the impossibility of marking both the bottom and top surfaces of the conveyed articles with a single marking device or apparatus; the failure to handle and mark the articles properly when the build-up or back-log of articles available at the infeed to the marking device is greater than a predetermined number; limitation upon the speed at which the conveyed articles can be marked; and restriction of the device to the marking of only round or oval articles.

Accordingly, it is a general object of the present invention to provide apparatus for marking conveyed articles that avoids all of the above mentioned disadvantages of the existing devices.

Specifically, it is an object of the invention to provide a marking apparatus that is substantially portable and arranged so that it can be disposed at any desired location along an article conveyor to mark the successive articles conveyed by the latter without requiring the interruption of the article conveyor.

Another object is to provide apparatus for marking conveyed articles that is compact in the direction of the conveyor path so as to impose a minimum interference around the article handling conveyor.

Another object is to provide apparatus for marking conveyed articles that employs a single star wheel overlying the article handling conveyor and automatically serving to separate the conveyed articles, and to carry the separated articles off the article handling conveyor, past a marking station to one side of the latter where the bottom or top surfaces, or both the bottom and top surfaces, of the articles are marked and then back onto the uninterrupted article handling conveyor, whereby the articles are under the positive control of either the article handling conveyor or of the star wheel at all times to avoid the disadvantages of either dead plates or lateral ploughing between parallel conveyors.

Another object is to provide marking apparatus of the described character wherein the single star wheel engages each of the successive conveyed articles in the direction generally at right angles to the article handling conveyor path so that the star wheel can separate articles of rectangular, as well as, circular and oval, configuration, and wherein a single star wheel may handle many differently dimensioned articles of similar shapes.

Still another object is to provide marking apparatus of the described character that is suitable for the marking of unstable articles, and that includes a hold-down moving with the articles through the apparatus, and, if necessary, an additional gripping mechanism associated with the star wheel to clamp the articles relative to the latter at the moment of marking.

A further object is to provide marking apparatus that avoids the rapid acceleration of the articles removed from, or returned to the article handling conveyor, while making possible a marking rate that has heretofore been unattainable.

In accordance with the present invention, the above, and other objects, features and advantages, are obtained by providing a portable marking apparatus mounted on casters or rollers whereby to be movable to a location adjacent an article handling conveyor, the apparatus including a base having at least one upstanding column extending therefrom and supporting a cantilevered arm structure overlying the base so that the latter can be disposed under an article handling conveyor to extend the cantilevered arm structure over the latter. A rotated spindle depends from the arm structure adjacent the free end of the latter and carries a star wheel with the axis of rotation of the latter being laterally centered with respect to the article handling conveyor, and a horizontal table extends from the upstanding column in the plane of the article handling conveyor to receive the successive articles as the latter are removed laterally from the conveyor by the star wheel and are moved, by the latter, along a generally semi-circular path defined by suitable guides on the table and on the conveyor structure. At approximately the mid-point of the above mentioned semi-circular path, the successive articles are engaged by a marking unit driven in synchronism with the star wheel and operative to mark a surface, or surfaces, of each article before the latter is returned, by the star wheel, to the uninterrupted article handling conveyor.

In the case where the bottom surfaces of the articles are to be marked by a marking element projecting through an opening in the table at the mid-point of the semi-circular path, a hold-down arrangement may be mounted on the star wheel carrying spindle for rotation with the star wheel, and the hold-down arrangement is urged downwardly upon the top of each successive article at the marking station. Since the hold-down arrangement travels with the articles to be marked, there is no tendency for the hold-down arrangement to tip or topple over the articles, even when the latter are unstable by reason of their having a high center of gravity.

When the marking apparatus embodying this invention is to be used for the marking of irregularly shaped articles, or when it is desirable for any other reason to hold the successive articles in the pockets or recesses of the star wheel, the apparatus may include a gripping mechanism associated with each of the pockets or recesses and rotating with the star wheel for actuation by a fixed cam so that each gripping mechanism is released or rendered inoperative as the related pocket receives an article to be marked from the article handling conveyor and as the article is returned to that conveyor, the cam being effective to render each gripping mechanism operative during the movement of the related pocket past the marking station.

In order that the invention may be clearly understood, illustrative embodiments thereof are hereinafter described in detail with reference to the accompanying drawings forming a part hereof, and wherein:

Fig. 2 is a horizontal sectional view taken along the line 2—2 of Fig. 1;

Fig. 3 is a vertical sectional view taken along the line 3—3 of Fig. 2;

Fig. 4 is a fragmentary, enlarged sectional view taken along the line 4—4 of Fig. 1;

Fig. 5 is a fragmentary plan view of the base portion and drive assembly of the apparatus of Figs. 1 and 2;

Fig. 6 is a horizontal sectional view taken along the line 6—6 of Fig. 1;

Fig. 7 is a fragmentary sectional view of a modified marking apparatus embodying the present invention and taken along the line 7—7 of Fig. 8;

Fig. 8 is a horizontal sectional view taken along the line 8—8 of Fig. 7;

Fig. 9 is an enlarged sectional view taken along the line 9—9 of Fig. 8; and

Fig. 10 is an enlarged plan view of a gripping mechanism in still another embodiment of the invention.

Figure 1:
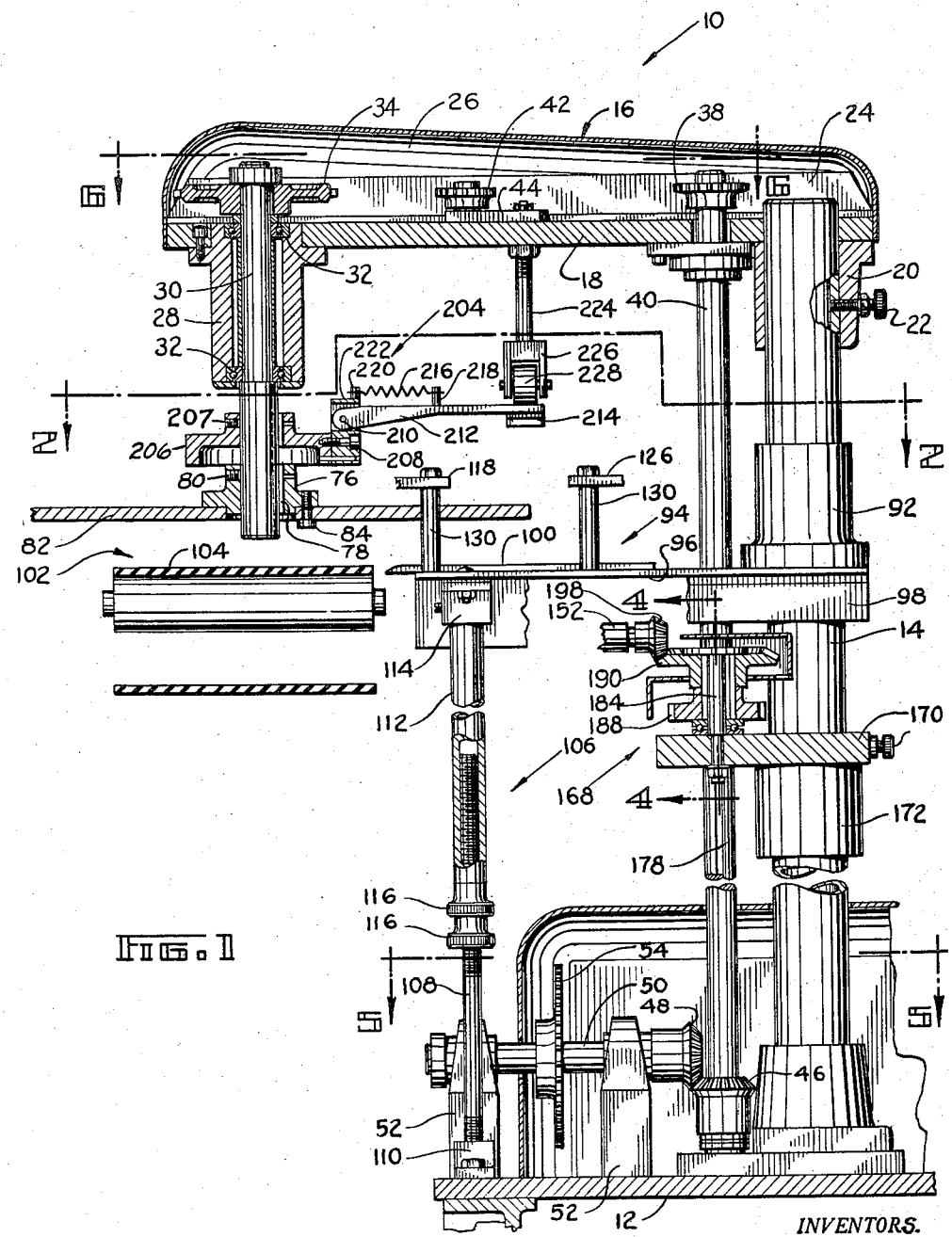
Fig. 1 is an elevational view, partly broken away and in section, of a marking apparatus embodying the present invention.

Referring to the drawings in detail, and initially to Fig. 1 thereof, it will be seen that marking apparatus constructed in accordance with one illustrative embodiment of the invention, and there generally identified by the reference numeral 10, may include a base 12 having an upstanding column 14 extending therefrom. A cantilevered arm structure generally identified by the reference numeral 16 extends horizontally from the upper end of column 14 and includes an elongated plate member 18 having a hollow boss 20 welded, or otherwise secured, to its under side adjacent one end and receiving the upper end of column 14. A set screw 22 extends through registering radial holes in the boss 20 and column 14 to hold the plate member 18 in a fixed position relative to the column. Angle members 24 (Figs. 1 and 6) extend along the opposite side edge portions of the top surface of plate member 18 to increase the rigidity of the latter, and a suitably shaped casing 26 encloses the top of the plate member.

A hollow sleeve 28 (Fig. 1) depends from the free end portion of plate member 18 and a vertical spindle 30 is journalled in roller bearings 32 at the top and bottom ends of the sleeve 28. The upper end of spindle 30 projects above the plate member 18 and, within the casing 26, has a sprocket wheel 34 keyed, or otherwise secured thereon. The sprocket wheel 34, and hence the spindle 30, is driven by a chain 36 (Fig. 6) that runs around the sprocket wheel 34 and around a sprocket 38 secured on the upper end of a drive shaft 40 that extends parallel, and adjacent, to the column 14 and is rotatably journalled, at its opposite ends, in the base 12 and the plate member 18. An idler sprocket 42 is carried by a bar 44 pivoted on top of the plate member 18 and engages the chain 36 to regulate the tension in the latter.

The drive shaft 40 is driven, at its lower end, through bevel gears 46 and 48 (Figs. 1 and 5) secured to the shaft 40 and to a horizontal, intermediate shaft 50, respectively. The intermediate shaft 50 is rotatably mounted in suitable bearing blocks 52 on the base 12 and has a sprocket 54 fixed thereon. A chain 56 engages around the sprocket 54 and a sprocket 58 disposed on the output shaft 60 of a speed reducing unit 62. A yieldable coupling, for example, in the form of a friction clutch acted upon by a spring 64 (Fig. 5), normally transmits the rotation of output shaft 60 to the sprocket 58, but permits the independent rotation of the latter for the purpose of synchronizing the action of the marking apparatus with the movement of articles on an associated conveyor and also permits the rotation of the shaft 60 independent of the sprocket 58 when the drive shaft 40 encounters excessive resistance to its rotation. The speed reducing unit 62 has an input shaft 66 carrying a grooved pulley 68 engaged by a V-belt 70, and the latter runs around a grooved pulley 72 on the shaft of an electric motor 74 which is also mounted on the base 12. From the foregoing, it is apparent that the spindle 30 is rotated, and that the power for such rotation is derived from the motor 74.

The lower portion of spindle 30 projects downwardly from the sleeve 28 and has a keyway along the length thereof, and a hub 76 is mounted on the lower portion of spindle 30 and held against rotation with respect to the latter by a key 78 engaging in the keyway of the spindle. Thus, the hub 76 is adjustable vertically along the lower portion of spindle 30, and a set screw 80 is carried by the hub to secure the latter in any desired vertical position along the spindle. A star wheel 82 (Figs. 1 and 2) is secured to the underside of the hub 76, for example, by suitably spaced bolts 84 (Fig. 1). The star wheel 82, as seen in Fig. 2, rotates in the direction of the arrow 86 and has a plurality of pockets or recesses 88 in the periphery thereof opening generally in the direction of rotation. A star wheel particularly adapted for the handling of round or oval articles, as is the illustrated star wheel 82, preferably has edge portions 90 between the successive pockets 88 that are gently curved and decreasing in their distance from the axis of rotation in the direction opposed to the direction of rotation so that the edge of the star wheel presents smooth transitions between the successive pockets. Although the illustrated star wheel has six pockets or recesses 88 in the periphery thereof, it is to be understood that the number of such pockets can be varied depending upon the speed at which articles are to be marked, the speed of rotation of the star wheel, the size of the star wheel and the size of the articles.

A sleeve 92 is slidable vertically on the column 14 between the base 12 and the cantilevered arm structure 16 and a table structure, generally identified by the reference numeral 94, extends from the sleeve 92 in the same general direction as the arm structure 16. The table structure 94 includes a support plate 96 stiffened by underlying angle members 98 (Figs. 1 and 3), and a surface plate 100 mounted upon the plate 96 and projecting beyond the latter at the edge remote from the column 14, with the projecting edge portion of the surface plate 100 having an inclined top surface to facilitate the sliding of articles onto the plate 100 from an adjacent conveyor at the same level. As seen in Fig. 1, the surface plate 100 extends under the star wheel 82, with the free or projecting edge of plate 100 being laterally spaced from the axis of rotation of star wheel 82 by a distance approximating one-half the lateral dimension of the conveyor 102 handling the articles to be marked. Thus, the marking apparatus 10, which may be made transportable by the provision of casters or the like (not shown) on the base 12, can be moved to an operative position where the star wheel 82 overlies the conveyor 102, with the axis of rotation of the star wheel substantially centered in the lateral direction relative to the conveyor, and the surface plate 100 extends along a side edge of the article carrying run of the conveyor belt 104 or the like.

As previously noted, the star wheel 82 is vertically adjustable with respect to the spindle 30 for accommodating conveyors of various different heights therebelow. In order to provide for vertical adjustment of the table structure 94 so that the surface plate 100 can be adjusted to the level of the article carrying run of conveyor belt 104, the table structure 94, at the side thereof remote from column 14, is supported by adjustable jacks generally identified by the numeral 106. Each jack 106 includes a threaded rod 108 extending upwardly from a bracket 110 on the base 12, a downwardly opening support tube 112 depending from a bracket 114 on the underside of the table structure and slidably receiving the threaded rod 108, and knurled nuts 116 adjustable along the rod 108 and supporting the lower end of the tube 112.

The apparatus 10 further has guides for directing the conveyed articles to a position where they are successively received in pockets of the star wheel, for cooperating with the star wheel in causing the pocketed articles to move along a generally semi-circular path off the conveyor and past a marking station, and for directing the marked articles back on to the conveyor. These guides include inner and outer guides 118 and 120, respectively, at the infeed end of the apparatus, inner and outer guides 122 and 124, respectively, at the outfeed end of the apparatus, and a guide 126 disposed between the guides 118 and 122 and having an arcuate edge 128 concentric with the axis of rotation of the star wheel 82.

The inner guides 118 and 122 and the guide 126 are mounted on posts 130 (Fig. 1) extending from the table structure 94, while the outer guides 120 and 122 are mounted on similar posts (not shown) attached to the supporting structure of the conveyor 102. In arranging the apparatus 10 adjacent a conveyor 102 for the purpose of marking the articles handled by the latter, the conveyor belt 104 need not be interrupted, and the only alterations that have to be made in the conveyor structure are the removal of sections of the usual straight guides 132 of the conveyor in the region to be occupied by the guides of the marking apparatus and the mounting of the outer guides 120 and 124 upon the conveyor structure.

The confronting edges of the guides 118 and 120 at the infeed end of the apparatus are parallel and, at one end, are contiguous to the edges of the guides 132 of the conveyor so that the latter feeds the conveyed articles in the direction of the arrow 134 (Fig. 2) into the space between the guides 118 and 120, while the opposite ends of the confronting edges of the guides 118 and 120 are respectively contiguous to the adjacent end of the edge 128 of guide 126 and tangential to the arcuate path followed by the inner edge portions of the pockets 88 as the star wheel is rotated. Thus, the articles A are successively fed by the conveyor belt 104 into the space between the infeed guides 118 and 120 and then along said space into contact with an edge portion 90 of the star wheel. As the star wheel is rotated, a pocket 88 of the latter receives the foremost article A between the infeed guides and moves the received article laterally off the conveyor belt 104 onto the surface plate 100. During the initial movement of the article by the star wheel 82, the article is also under the influence of the conveyor belt so that the resultant of the forces acting on the article can be represented by a vector that is generally tangential to the path of the pocket 88 receiving the article. After the article to be marked has been moved onto the surface plate 100 where the article is driven only by the star wheel, the guide 126 cooperates with the latter to hold the article in the related pocket 88 of the star wheel.

Since the reliable operation of the star wheel 82 in removing the foremost article to be marked from between the infeed guides 118 and 120 requires a substantial contact pressure between the foremost article and the edge portion 90 of the star wheel, and since that contact pressure results from the friction between the article and the conveyor belt 104 and is increased by an accumulation of articles at the infeed end of the apparatus so that the contact pressure is the product of the frictional forces acting on the accumulated articles, the marking apparatus 10 preferably includes an arrangement for halting the operation of the apparatus, or for actuating a signal, in the event that the accumulation or back-log of articles falls below a predetermined number. In the illustrated apparatus 10, such an arrangement includes two micro-switches 136 and 138 (Fig. 2) mounted upon a guide 132 of the conveyor at spaced apart locations before the infeed end of the apparatus 10. The micro-switches 136 and 138 are normally open and are actuated by feelers 140 which normally project into the path of the conveyed articles as represented by the broken lines of Fig. 2. When the feelers 140 are engaged by articles A and thereby moved to the full-line positions of Fig. 2, the related switches 136 and 138 are closed. The switches 136 and 138 are connected in series in the energizing circuit (not shown) of the motor 74 so that the latter is energized to operate the apparatus 10 only when the switches 136 and 138 are simultaneously closed by the presence of the desired accumulation of articles to be marked at the infeed end of the apparatus. Alternatively, or in addition to the above, the switches 136 and 138 may control the actuation of a signal (not shown) so that a decrease in the accumulation or backlog of articles on the conveyor will result in the actuation of the signal to advise an attendant either to halt or slow the operation of the marking apparatus or to speed up the supplying of articles to the conveyor 102.

The apparatus 10 further includes means for applying suitable markings, for example, coded indications of the date of filling of a container or of the contents of the latter, as the successive articles pass the midpoint of the generally semi-circular path followed by the articles during their engagement by star wheel 82. In Fig. 2, the location of the marking station is indicated by an article present at that station and identified as A'.

Although the illustrated apparatus 10 is adapted for the marking of the bottom surfaces of the successive articles of each article occupies the position of the article A', it is to be understood that marking units may be provided in apparatus embodying the present invention to mark the top surfaces, the top and bottom surfaces, the bottom and side surfaces, the top and side surfaces or the top, bottom and side surfaces of the successive articles.

In order to provide for marking of the bottom surfaces of the successive articles at the location of the article A', the surface plate 100 of the table structure 94 has an opening 142 therein (Fig. 3) through which the marking element of a marking unit 144 can project to contact the bottom surface of the article A' at the marking station. The marking unit 144 may be of the kind disclosed in the co-pending application for Letters Patent of Victor E. Hugo and Andrew J. Alessi, Jr., Serial No. 498,247, filed March 31, 1955, now U.S. Patent No. 2,829,589, and generally includes a mounting bracket 146 secured to a support plate 148 depending from one of the angle members 98 of the table structure, a frame 150 pivoted on a drive shaft 152 journalled in suitable bearings in the bracket 146 and extending normal to a plane tangential to the path of travel of the articles at the marking station, an ink fountain or reservoir 154 pivoted on the frame 150 and rotatably supporting an ink supplying roll 156 that dips into the supply of ink in the reservoir, a metering roll 158 supported at one end by the frame 150 in rolling contact with the ink supplying roll, and a marking element 160 that may be in the form of a sector, as shown, to reach into and mark the bottom surface of an article where such surface is recessed or concave, and that is engageable with the metering roll 158 to intermittently receive ink from the latter. In a marking unit of the described character, the metering roll 158 and marking element 160 are preferably driven from the shaft 152 by a suitable gear transmission (not shown).

In order to permit adjustment of the projection of the marking element 160 through the opening 142 of surface plate 100, an eye-bolt 162 is pivoted to the frame 150 and passes through an opening in the plate 148, with nuts 164 and 166 being provided on the bolt 162 at the opposite sides of the plate 148 for controlling the angular position of the frame 150 about the axis of drive shaft 152.

The drive shaft 152 of the marking unit 144 is preferably driven from the same drive shaft 40 that is included in the transmission between the motor 74 and the star wheel carrying spindle 30 so that the rotation of the marking element 160 will be synchronized with the movement of the successive articles by the star wheel 82. The rotation of drive shaft 40 is transmitted to drive shaft 152 by an assembly that is generally identified by the reference numeral 168 (Figs. 1 and 4) and includes a support plate 170 having a sleeve 172 thereon slidable on the column 14 and held at an adjusted level on the latter by a set screw 174 so that the transmission assembly 168 can be adjusted vertically with the table structure 94 from which the marking unit 144 depends. The drive shaft 40 extends through a bearing 176 (Fig. 4) in the plate 170 and has a keyway 178 that slidably receives a key 180 carried by a spur gear 182 on the shaft 40 above the plate 170. An upstanding stub shaft 184 is secured to the plate 170 at a location laterally spaced from the shaft 40 and carries a rotatable sleeve 186 on which a spur gear 188 and a bevel gear 190 are both secured by a key 192. A stub shaft 194 also extends upwardly from the plate 170 between the shafts 40 and 184 and has an idler gear 196 rotatable thereon in meshing engagement with the gears 182 and 188. Finally, a bevel gear 198 is provided on the shaft 152 of the marking unit and meshes with the bevel gear 190.

Following the application of markings to the successive articles by the marking unit 144, the articles are returned to the conveyor belt 104 by the star wheel 82 and the outfeed guides 122 and 124 which have curved confronting edges extending from the edge 128 of guide 126 and tangentially from the circular path of the inner edge portions of pockets 88, respectively, to the guides 132 at the outfeed end of apparatus 10. As soon as the marked article, for example, the article A'', is moved from the surface plate 100 onto the conveyor belt 104 the latter begins to exert a force on the marked article tending to move the latter out of the related pocket 88 which opens radially, as well as in the direction of the star wheel rotation. Thus, the belt 104 moves the marked articles away from the star wheel through the space between the guides 122 and 124 and then between the usual guides 132 of the conveyor 102.

As seen in Fig. 2, the guides 118, 120, 122 and 124 have elongated, laterally extending slots 200 by which they are adjustably mounted on the related support posts so that the spacing between the inlet and outlet guides, as well as their relation to the star wheel can be adjusted over a wide range to accommodate articles of different sizes therebetween, while the guide 126 also has lateral mounting slots 202 of shorter length to permit some adjustment thereof with respect to the star wheel, but it is apparent that any large change in the lateral dimensions of the articles being marked requires replacement of the guide 126, the edge 128 of which must remain concentric with the axis of the star wheel.

When the weight of the article being marked on their bottom surfaces is such that it is desirable to apply a downward force to each article during the marking thereof, the apparatus 10 may include a hold-down assembly, 204 (Figs. 1 and 2) The illustrated hold-down assembly 204 includes a hub 206 keyed on the spindle 30 above the star wheel hub 76 and held in any desired vertically adjusted position by a set screw 207. The hub 206 has a polygonal plan form (Fig. 2) and includes a flat edge portion for each of the pockets 88 of the related star wheel. Thus, the hub of the illustrated embodiment is hexagonal. A fitting 208 is secured to each flat edge portion of the hub 206 and has a bifurcated upper part carrying a pin 210 on which the inner end of a related radial arm 212 is pivotally mounted. In the hold-down assembly 204, the free end of each arm 212 carries a pad structure 214 overlying the top of an article received in the related pocket 88. A tension spring 216 extends between a pin 218 on each arm and a pin 220 on a cap 222 secured to the top of the related fitting 208, and the spring 216 acts to normally raise the arm 212 against the cap 222 to a position where the pad 214 frees an article in the related pocket 88. A rod 224 is threaded at its upper end into a suitably tapped opening in the plate member 18 of arm structure 16 and depends from the latter in vertical registration with the opening 142 of the surface plate 100. A bifurcated bracket 226 is secured on the lower end of rod 224 and carries a rotatable roller 228. The rod 224 is adjusted with respect to arm structure 16 so that, as each pocket 88 of the star wheel reaches the marking station to dispose the related article A' over the opening 142, the pad structure 214 of the associated hold-down arm 212 comes under the roller 228 and is moved downwardly by the latter against the top of the article being marked. After the article has been marked and is moved away from the marking station, the pad structure 214 associated with the marked article moves with the latter out from under the roller 228, so that the spring 216 can then raise the arm 212 and the pad 214 to free the marked article from the latter.

Although the illustrated hold-down assembly 204 includes individually supported pad structures 214 for engaging the tops of articles in the several pockets 88 of the star wheel, it is apparent that a resilient ring (not shown) may be substituted for the several pad structures 214 and mounted on the free ends of arms 212 so that the portion of such ring overlying the top of an article at the marking station will be engaged, from above, by the roller 228 and urged by the latter into hold-down engagement with the article being marked, while the other portions of the ring are clear of the tops of the articles in the related pockets by the action of the springs 216 on the arms 212 supporting such other portions of the ring.

In either case, that is, in an arrangement having individual hold-down pad structures 214, as shown in the drawings, or in an arrangement having a single continuous hold-down ring, the article moving over the opening 142 and being marked by the unit 144 is held down by a member that moves with the article in the direction of rotation of the star wheel 82 so that the engagement of the article by the hold-down arrangement has no tendency to tip or topple-over the engaged article, even when the latter has a high center of gravity and, therefore, is relatively unstable.

Referring now to Figs. 7, 8 and 9, of the drawings, a modification of the above described marking apparatus 10 is therein illustrated to the extent necessary for an understanding of the modified structures and generally identified by the reference numeral 10a, with the parts of the apparatus 10a corresponding to parts of the apparatus 10 being identified by the same reference numerals with the letter "a" appended thereto.

The apparatus 10a is generally similar to the apparatus 10, with the notable exceptions that the former includes a mechanical arrangement facilitating the adjustment of the level of the star wheel 82a and mechanisms for gripping the articles within the related pockets 88a of the star wheel during the marking of the articles.

In the marking apparatus 10a, the hub 76a that carries the star wheel 82a is slidable along the rotated spindle 30a and keyed to the latter for rotation therewith. The hub 76a has an elongated, tubular extension that extends upwardly through an annular portion 230 at the lower end of a suspension bracket 232. The extension of hub 76a is externally threaded at the upper portion thereof and receives nuts 234 that secure a roller bearing 236 between the nuts 234 and the upper edge of annular portion 230, whereby the hub 76a and the star wheel 82a are suspended from the bracket 232 and move vertically relative to the spindle 30a in accordance with the corresponding movements of the bracket 232. At its upper end, the bracket 232 has a hollow boss 238 with an internally threaded bushing 240 secured in the latter and receiving a vertical adjusting screw 242. The upper end of the screw 242 is rotatably mounted in a bearing 244 within an ear 246 on a support 248 and is held against axial displacement relative to the latter. The support 248 extends radially from the column 14a toward the spindle 30a and has two tubular mounting projections 250 and 252 through which the column 14a extends. A set screw 254 extends through the tubular mounting projection 252 into the column 14a to hold the support 248 against vertical or angular movement relative to the column.

The support 248 is of generally rectangular configuration, when viewed in side elevation (Fig. 7), with the mounting projections 250 and 252 extending from one vertical edge and the ear 246 extending from the top of the opposite vertical edge. Along the vertical edge from which the ear 246 projects, the support 248 has oppositely directed guide flanges 256 (Fig. 8), and the boss 238 of suspension bracket 232 has L-shaped extensions 258 at its opposite sides engaging the guide flanges 256, and to which lugs 260 are secured, so that the extensions 258 and lugs 260 embrace the related guide flanges 256 to guide the bracket 232 along a vertical path in response to rotation of screw 242. The screw 242 has a hand wheel 262 on its upper end by which the screw can be conveniently turned to raise and lower the star wheel 30a for action in cooperation with article handling conveyors of different heights.

As previously mentioned, the marking apparatus 10a further includes gripping mechanism associated with each of the pockets 88a of the star wheel and generally identified by the reference numeral 264 (Figs. 8 and 9). Each of the gripping mechanisms 264 includes an arm 266 pivotally mounted, at one end, on a vertical pin 268 carried by a disc 270 overlying the star-wheel 82a and having a hub 272 (Fig. 7) that extends around the hub 76a below the annular portion 230 of the suspension bracket 232. The hub 272 is secured to the hub 76a so that the disc 270 rotates with the star wheel 82a. The free end portion of each arm 266 is bent radially outward, as at 274, and a gripping pad 276 has a threaded stem 278 extending through the bent portion 274 and adjustably secured relative to the latter by nuts on the stem 278 at the opposite sides of portion 274. The arm 266 is movable about the pivot pin 268 between an inoperative or released position, where the related gripping pad 276 is disposed within the periphery of the star wheel 82a, and an operative or gripping position, where the pad 276 is disposed radially outside of the periphery of the star wheel and is moved toward the related pocket 88a of the latter to hold an article in said pocket.

The arm 266 of each gripping mechanism 264 is urged to its inoperative or released position by a tension spring 280 extending between a pin 282 on the arm 266 and a pin 284 anchored in the periphery of disc 270. The movements of the arms 266 of the several gripping mechanisms are controlled so that, when an article is received in the related pocket 88a from an article handling conveyor and when the marked article is returned from the star wheel pocket to the article handling conveyor, the arm 266 associated with the pocket will be disposed in its inoperative or released position to avoid interference with the free movement of the article into, and out of, the related pocket 88a, and, when the related pocket of the star wheel is disposed at or near the marking station, the arm 266 is moved to its operative position to cause the pad 276 to firmly grip and hold the article being marked within the related pocket.

In order to achieve the above described control of the movements of the arms 266, the marking apparatus 10a includes a radial cam 286 secured by bolts 288 to an annular flange 290 depending from the annular portion 230 of bracket 232 and having circumferential slots 292 receiving the bolts 288 so that the cam 286, which is disposed immediately above the disc 270, can be angularly adjusted with respect to the rotationally fixed flange 290. Each gripping assembly 264 further includes a generally L-shaped arm 294 pivoted, at one end, on the pin 268 above the related arm 266 and carrying a cam follower roller 296 intermediate the angularly related portions of the arm 294 for rolling contact with the cam 286. The free end portion of the arm 294 is coupled to the related arm 266 by an eye-bolt 298 that is pivotally connected to the arm 266 and extends through the arm 294 to receive nuts at the side of the latter facing away from the related arm 266 for limiting the angular movement of the arms 266 and 294 in the directions away from each other. A compression spring 300 is provided on each eye-bolt 298 between the arms 266 and 294 to urge the latter angularly apart to the full extent permitted by the nuts on the eye-bolt.

The spring 280 of each gripping mechanism causes the arms 266 and 294 to pivot together in the clock-wise direction as viewed in Fig. 8, for engaging the roller 296 with the periphery of the cam 286. The cam 286 includes a major portion of relatively small radius corresponding to the normal inoperative condition of the gripping mechanism, and a portion of relatively large radius that is engaged by the roller 296, when the pocket 88a associated with the related gripping mechanism reaches the marking station, and that causes counter-clockwise pivoting of the arms 266 and 294 to move the arm 266 to its operative or gripping position. Normally, the spring 300 maintains the angular spacing between the arms 266 and 294 determined by the location of the nuts on eye-bolt 298. However, when resistance to the movement of the pad 276 toward the related pocket 88a is encountered, the spring 300 yields to prevent damage to the article in the pocket or to the gripping mechanism. It is apparent that the nuts on the stem 278 of the gripping pad 276 and the nuts on the eye-bolt 298 permit adjustment of the operative position of the pad relative to the associated pocket over a wide range, so that the gripping mechanisms 264 can cooperate with the star-wheel 82a to achieve proper marking of articles having substantially different shapes and dimensions.

Fig. 10 illustrates a modified form of gripping mechanism generally identified by the reference numeral 264b and capable of being substituted for the gripping mechanisms 264 described above. The parts of gripping mechanism 264b that correspond to the described parts of mechanism 264 are identified by the same reference numerals, but with the letter "b" appended thereto.

Each gripping mechanism 264b includes a bell-crank member made up of integral arms 266b and 294b and pivoted, intermediate said arms, on a vertical pin 268b carried by a disc 270b that overlies the star wheel 82b. At its free end, the arm 294b carries a cam follower roller 296b that engages the periphery of a fixed radial cam 286b, and a tension spring 280b is connected, at its opposite ends, to the arm 266b and to the disc 270b (the connection to the latter being omitted in Fig. 10) to urge the bell-crank in the clock-wise direction and causing engagement of the roller 296b with cam 286b.

The free end portion of arm 266b is bent radially outward, as at 274b, and the threaded stem 278b of a gripping pad 276b extends through a suitable opening in the portion 274b and receives adjusting nuts 302 at the side of the latter facing away from the pad 276b. A compression coil spring 304 is arranged on the stem 278b between the pad 276b and the arm portion 274b to urge the pad away from arm portion 274b to the extent permitted by the adjusting nuts 302. Thus, the nuts 302 determine the position of the pad 276b relative to the associated pocket 88b of the star wheel 82b in the gripping condition of the bell-crank 266b—294b, while the spring 304 is compressed to permit movement of pad 276b relative to arm 266b when the pad encounters excessive resistance to its movement toward the related pocket.

From the foregoing, it is apparent that marking apparatus embodying the present invention can be associated with uninterrupted conveyors to mark articles of varying shapes and sizes handled by the latter, and that such apparatus includes a single star wheel operative to remove the articles from the conveyor, to control the article movements during the marking thereof, and to return the marked articles to the conveyor.

Although particular embodiments of the invention have been described in detail herein and shown in the accompanying drawings, it is to be understood that the invention is not limited to such embodiments, and that various changes and modifications can be effected in the latter without departing from the scope or spirit of the invention as defined in the appended claims.

What is claimed is:

1. In combination with an uninterrupted article handling conveyor; apparatus for applying markings to the successive articles transported by said conveyor and comprising an upstanding supporting structure at one side of said conveyor, a cantilevered structure extending over said conveyor and supported at one end from said upstanding supporting structure, a star wheel of substantially greater pitch diameter than the width of said conveyor, means rotatably supporting said star wheel from said cantilevered structure with the axis of rotation of the star wheel extending vertically in spaced relation to said upstanding supporting structure and being substantially centered, in the lateral direction, with respect to said conveyor and with the star wheel disposed at a level above said conveyor where it is interposed in the path of the conveyer articles, said star wheel having pockets in the periphery thereof for receiving the successive conveyed articles, means for rotating said star wheel so that the latter transports the successive articles received in said pockets from said conveyor along a generally semi-circular path extending off the latter and then back to the conveyor; means operative to apply markings to the bottom surfaces of the successive articles received in said pockets as the latter pass an intermediate location along said semi-circular path disposed off to one side of said conveyor, hold-down means moving with said star wheel, and means in the path of said hold-down means operative to move the latter downwardly upon the article in each pocket as the latter passes said location where marking of the bottom surface of the article is effected.

2. Apparatus for marking articles transported by an uninterrupted article handling conveyor; said apparatus comprising a supporting structure including a table adapted for disposition at one side of the conveyor and an overhung upper structure extending laterally beyond said table at a level substantially above the latter, a rotated spindle depending from said overhung upper structure at a location laterally beyond said table and adapted to have its axis substantially centered, in the lateral direction, with respect to the conveyor, a star wheel on said spindle having a pitch radius greater than the distance between the axis of said spindle and the edge of said table, said star wheel having peripheral pockets for receiving successive articles from the conveyor, guide means cooperating with said star wheel so that, when said table is disposed at one side of the conveyor with said star wheel interposed in the path of travel of articles on the conveyor, the successive articles are directed into said pockets of the star wheel and transported by the latter along a generally semi-circular path extending off the conveyor, over said table and back onto the conveyor where the articles are directed out of said pockets for continued travel on the conveyor, said table having an opening therein intercepted by said semi-circular path so that the successive articles received by said pockets of the star wheel are transported by the latter over said opening, marking means extending upwardly through said opening and operatively synchronized with the rotation of said star wheel to apply markings to the bottom surfaces of the successive articles as the latter pass over said opening, hold-down means disposed above said star wheel and rotating with the latter, and means in the path of said hold-down means urging said hold-down means downwardly at a location above said opening to bear upon the top of an article being marked.

3. In combination with an uninterrupted article handling belt conveyor; apparatus for applying markings to the successive articles transported by said conveyor and comprising a rotated star wheel having peripheral pockets opening radially and tangentially in the direction of rotation of the star wheel, means supporting said star wheel from above over said belt conveyor with the axis of rotation of said star wheel substantially centered with respect to the lateral width of said belt conveyor, said star wheel having a pitch diameter substantially greater than said width of the belt conveyor so that said pockets move laterally across said conveyor at diametrically opposed locations lying on the longitudinal axis of the belt conveyor and follow a semi-circular path extending off said belt conveyor between said diametrically opposed locations; infeed guide means directing the successive conveyed articles against the periphery of said star wheel at one of said locations so that the foremost conveyed article is received in a pocket of the star wheel there moving laterally across the belt conveyor for transportation by the star wheel along said semi-circular path, a table disposed to one side of said belt conveyor at the level of the latter to support the articles transported in the pockets of the star wheel off said conveyor along said semi-circular path, said table having an opening at a station along said semi-circular path, marking means projecting upwardly through said opening to apply markings to the successive articles as the latter pass over said opening, outfeed guide means directing the successive marked articles out of the related pockets and back onto the belt conveyor at the other of said diametrically opposed locations, a hold-down assembly disposed above said star wheel and rotating with the latter to overlie the articles received in the pockets of said star wheel, means normally spacing said assembly upwardly from the tops of articles in said pockets, and means at said station bearing downwardly on said hold-down assembly to there urge the latter into contact with an article being marked for resisting raising of the contacted article from said table.

4. The combination according to claim 3; wherein said hold-down assembly includes arms extending radially from the axis of rotation of said star wheel and registering with said pockets of the latter, means pivotally supporting the inner ends of said arms for swinging of the latter in vertical planes, and article engaging means at the free ends of said arms and overlying the related pockets, said means normally spacing said assembly upwardly from the tops of articles in said pockets includes springs acting on said arms to pivot the latter upwardly in said vertical planes, and said means bearing downwardly on the assembly includes a roller at said station and there engaging said article engaging means from above to urge the latter downwardly against the action of the spring associated with the arm then extending toward said station.

5. In combination with an uninterrupted article handling belt conveyor; apparatus for applying markings to the successive articles transported by said conveyor and comprising a rotated star wheel having peripheral pockets opening radially and tangentially in the direction of rotation of the star wheel, means suporting said star wheel from above over said belt conveyor with the axis of rotation of said star wheel substantially centered with respect to the lateral width of said belt conveyor, said star wheel having a pitch diameter substantially greater than said width of the belt conveyor so that said pockets move laterally across said conveyor at diametrically opposed locations lying on the longitudinal axis of the belt conveyor and follow a semi-circular path extending off said belt conveyor between said diametrically opposed locations, infeed guide means directing the successive conveyed articles against the periphery of said star wheel at one of said locations so that the foremost conveyed article is received in a pocket of the star wheel there moving laterally across the belt conveyor for transportation by the star wheel along said semi-circular path, marking means disposed adjacent said semi-circular path to apply markings to the successive articles transported off the belt conveyor, outfeed guide means directing the successive marked articles out of the related pockets and back onto said belt conveyor at the other of said diametrically opposed locations, gripping means associated with each of said pockets of the star wheel and movable relative to the latter between an operative position where said gripping means extends into the related pocket at the side of the latter facing in the direction of rotation of the star wheel to hold an article in said pocket and an inoperative position where said gripping means is withdrawn from the related pocket to permit the free movement of an article into and out of the pocket, and actuating means for said gripping means effective to normally dispose the latter in said inoperative position and to move the gripping means to its operative position as the related pocket passes the location of said marking means, said gripping means including an arm pivoted at one end for swinging about an axis fixed relative to said star wheel and disposed radially inward from the related pocket, a gripping pad, means adjustably mounting said gripping pad on the free end portion of said arm, and spring means yieldably urging said arm to swing about the related pivoting axis toward the direction of rotation of the star wheel; and wherein said actuating means includes a fixed cam, and cam follower means connected to said arm of each gripping means, said cam having a major portion which, when engaged by said cam follower means, permits said spring means to move the related arm to said inoperative position where said arm and pad are radially within the periphery of the star wheel, and a portion of relatively minor angular extent which, when engaged by said cam follower means, rocks the related arm in the direction projecting said pad beyond the periphery of the star wheel and toward the related pocket in the direction opposed to the star wheel rotation to dispose said gripping means in said operative position.

6. The combination according to claim 5; wherein each gripping means further includes means providing a yieldable transmission between the movements of said cam follower means and the movements of the related gripping pad so that, when a predetermined resistance to the movement of said pad toward the related pocket is encountered, said transmission means yields to avoid damage to the articles and to the marking apparatus 7. The combination according to claim 6; wherein said yieldable transmission means is interposed between said arm and said cam follower means.

8. The combination according to claim 6; wherein said yieldable transmission means is interposed between said arm and said gripping pad.

9. In combination with an uninterrupted article handling conveyor including a horizontal belt; apparatus for applying markings to the successive articles transported by said belt and comprising a cantilevered structure extending laterally over said belt from a support at one side of the latter, a rotated spindle depending from said cantilevered structure with the axis of said spindle substantially centered with respect to said belt in the lateral direction, a star wheel having pockets in the periphery thereof and a pitch diameter substantially greater than the lateral width of said belt, means mounting said star wheel on said spindle for rotation with the latter, said mounting means being adjustable along said spindle for disposing said star wheel at a level slightly above that of said belt so that said star wheel is interposed in the path of travel of articles on said belt, said pockets of the star wheel opening radially outward and tangentially in the direction of rotation of the star wheel, a table vertically adjustable along said support at one side of said belt for disposition at the level of the latter, said pockets of the star wheel moving laterally across said belt in the directions in which they open tangentially at diametrically opposed locations lying on the longitudinal axis of said belt and following a semi-circular path between said locations extending off said belt and over said table, infeed guide means on said conveyor and table directing the successive conveyed articles against the periphery of said star wheel at one of said diametrically opposed locations so that the foremost conveyed article is received in a pocket of the star wheel there moving laterally across said belt for transportation in said pocket along said semi-circular path, marking means disposed adjacent said semi-circular path in a region of the latter extending over said table to apply markings to the successive articles transported along said region, and outfeed guide means on said table and conveyor cooperating to direct the marked articles out of the related pockets of the star wheel as said pockets move laterally across the belt at the other of said diametrically opposed locations and thereby returning the marked articles to said belt.

(References on following page)

References Cited in the file of this patent

UNITED STATES PATENTS

| | | |
|---|---|---|
| 1,223,610 | Pittaluga | Apr. 24, 1917 |
| 1,300,406 | Johnson and Oslund | Apr. 15, 1919 |
| 1,309,935 | Calleson | July 15, 1919 |
| 1,800,383 | Guenther | Apr. 14, 1931 |
| 2,195,173 | Jackson | Mar. 26, 1940 |
| 2,202,762 | Freed | May 28, 1940 |
| 2,308,154 | Carter | Jan. 12, 1943 |
| 2,528,860 | Clark | Nov. 7, 1950 |
| 2,612,254 | Carter | Sept. 30, 1952 |